(12) United States Patent
Gamache et al.

(10) Patent No.: US 9,127,540 B2
(45) Date of Patent: Sep. 8, 2015

(54) METHOD OF RECOVERING OIL AND PRODUCING PRODUCED WATER THAT IS CONCENTRATED AND DRIED BY A DOUBLE DRUM DRYER

(71) Applicant: Veolia Water Solutions & Technologies North America, Inc., Moon Township, PA (US)

(72) Inventors: David E. Gamache, Oswego, IL (US); Justin Scurte, Yorkville, IL (US); Charlotte Bessiere, Chicago, IL (US)

(73) Assignee: VEOLIA WATER TECHNOLOGIES, INC., Moon Township, PA (US)

( * ) Notice: Subject to any disclaimer, the term of this patent is extended or adjusted under 35 U.S.C. 154(b) by 343 days.

(21) Appl. No.: 13/762,593

(22) Filed: Feb. 8, 2013

(65) Prior Publication Data
US 2013/0269943 A1 Oct. 17, 2013

Related U.S. Application Data

(60) Provisional application No. 61/624,422, filed on Apr. 16, 2012.

(51) Int. Cl.
| | | |
|---|---|---|
| *E21B 43/16* | (2006.01) | |
| *E21B 43/40* | (2006.01) | |
| *E21B 21/06* | (2006.01) | |
| *B01D 36/04* | (2006.01) | |
| *E21B 43/24* | (2006.01) | |
| *C02F 9/00* | (2006.01) | |
| *C02F 1/04* | (2006.01) | |
| *C02F 1/52* | (2006.01) | |
| *C02F 11/12* | (2006.01) | |
| *C02F 103/10* | (2006.01) | |

(52) U.S. Cl.
CPC .............. *E21B 43/2408* (2013.01); *C02F 9/00* (2013.01); *E21B 43/16* (2013.01); *E21B 43/40* (2013.01); *B01D 2311/08* (2013.01); *C02F 1/04* (2013.01); *C02F 1/52* (2013.01); *C02F 11/126* (2013.01); *C02F 2103/10* (2013.01)

(58) Field of Classification Search
CPC ........... B01D 2311/04; B01D 2311/08; B01D 2311/2669; E21B 21/065; E21B 43/16; E21B 43/2408
See application file for complete search history.

(56) References Cited

U.S. PATENT DOCUMENTS

| | | | | |
|---|---|---|---|---|
| 5,559,263 A * | 9/1996 | Smith | ........................... | 556/183 |
| 2012/0168364 A1* | 7/2012 | Evans | ........................... | 210/202 |

* cited by examiner

*Primary Examiner* — Zakiya W Bates
(74) *Attorney, Agent, or Firm* — Coats and Bennett, PLLC

(57) ABSTRACT

A method of treating concentrated produced water derived from a steam assisted gravity discharge oil recovery process is described. The method includes utilizing a double drum dryer to dry a concentrated slurry and produce a dried concentrate for deposition in a landfill.

29 Claims, 4 Drawing Sheets

METHOD OF RECOVERING OIL AND PRODUCING PRODUCED WATER THAT IS CONCENTRATED AND DRIED BY A DOUBLE DRUM DRYER

This application claims priority under 35 U.S.C. §119(e) from the following U.S. provisional application: Application Ser. No. 61/624422 filed on Apr. 16, 2012. That application is incorporated in its entirety by reference herein.

BACKGROUND

Recovery of oil from oil-bearing geologic formations in many instances requires the use of large quantities of water. Water is injected into such formations to facilitate moving the oil from the formation and delivering it to the surface where the oil and water are separated. In some applications, the water is used one time, cleaned appropriately for stream discharge, and discharged. Waste cleaned from the water is commonly placed in a landfill. The cost and environmental concerns have provided impetus for both reusing the water and reducing the volume or waste material to be landfilled.

In the well-known "Steam-Assisted Gravity Drainage" approach to heavy oil recovery, two horizontal wells are drilled into a formation. One of the wells, known as the injection well, is disposed above and spaced apart from the other well, known as the collection well. Water in the form of steam is directed into the injection well where the steam condenses and gives off sensible heat that warms the oil in the formation. The warming of the oil reduces the oil viscosity and adhesion to rock in the formation. A mixture of oil and water flows into the collection well from whence it is removed to the surface. The oil and water are separated, and the separated water, commonly referred to as produced water, is prepared for reuse. Reuse, of course, entails making steam, in many cases high quality steam. So, preparing the produced water for reuse requires removing contaminants from the produced water. Such contaminants include those that can lead to scaling and fouling steam generation equipment. Present means of preparing the produced water for reuse produces significant quantities of wet waste, and landfilling such wastes is both expensive and environmentally challenging. Improved means are needed to reduce the volume of wastes in such applications.

SUMMARY

The present invention, in one embodiment, entails a method of recovering oil, treating resulting produced water, and utilizing the treated produced water to generate steam for injection into an oil-bearing formation. The method provides collecting an oil-water mixture from the oil-bearing formation and separating the oil from the oil-water mixture to produce oil and produced water. The produced water is subjected to a concentrating process from which is formed a concentrate and a diluted stream. The diluted stream is directed to a steam generator and steam is produced. The produced steam is directed into the oil-bearing formation. The method, in one embodiment, further includes directing the concentrate to a steam-operated drum dryer having a pair of side-by-side counter-rotating drums. More particularly, the method includes depositing the concentrate on an upper portion of the drum dryer and drying the concentrate with the drum dryer by rotating the drums. The method further entails directing the concentrate through a nip formed between the counter-rotating drums, and, after the concentrate passes through the nip of the counter-rotating drums, collecting the dried concentrate.

In another embodiment of the present invention, the produced water is concentrated by the combined processes of an evaporator and a crystallizer. The produced water is first directed to an evaporator which produces a first distillate and an evaporator concentrate. The concentrate produced by the evaporator is directed to the crystallizer that further concentrates the produced water and produces a second distillate or diluted stream and a crystallizer concentrate. The concentrate produced by the crystallizer is deposited in an upper portion of a counter-rotating double drum dryer that dries the concentrate. The dry concentrate is suitable for disposal in a landfill.

Other objects and advantages of the present invention will become apparent and obvious from a study of the following description and the accompanying drawings which are merely illustrative of such invention.

DETAILED DESCRIPTION

The present invention entails a method of recovering oil from an oil-bearing formation by utilizing steam to aid in the recovery and treating the resulting water for further utilization. A typical application is the Steam Assisted Gravity Drainage process, otherwise referred to as "SAGD." The method includes directing the flow of an oil and water mixture from the oil-bearing formation and separating a substantial portion of the oil from the water. The separated oil is collected, and the remaining water, known as "produced water," is processed to generate water that can be used for generating steam. Steam is injected into the oil-bearing formation. Heat from the condensation of the injected steam mobilizes oil in the formation to produce the aforementioned oil and water mixture. The term "produced water" means water that is produced when oil or gas is extracted from the ground. The term "produced water" also encompasses or includes once-through steam generator blowdown and tailings pond water. The term "produced water" as used herein also includes produced water blended with other waste streams or waste products.

The volume of water required in oil recovery processes such as SAGD makes recovering and reusing as much as possible of the water desirable. In order to reuse the resulting or produced water, the water quality must be improved sufficiently to enable making steam from the water without undue scaling and fouling of steam production equipment. Accordingly, the produced water is typically processed to produce water suitable for steam generation. Processing the produced water includes concentrating the produced water by extracting as much relatively clean water from the produced water as practical. Concentrating the produced water may be accomplished in various methods. The process of concentrating the produced water generates a diluted stream (sometimes a distillate) and a concentrated stream. The diluted stream may be directed to a steam generating system to generate steam to be used as described above. The concentrated stream, or concentrate, is generally viewed as a waste product that generally requires further treatment before disposal. Further treatment of the concentrate, as disclosed herein, includes a drying process utilizing a double drum dryer. Vapor is evolved from the concentrate drying process and collected, and the dried concentrate is collected and may be discharged to a landfill or other disposal site.

Figure 1:
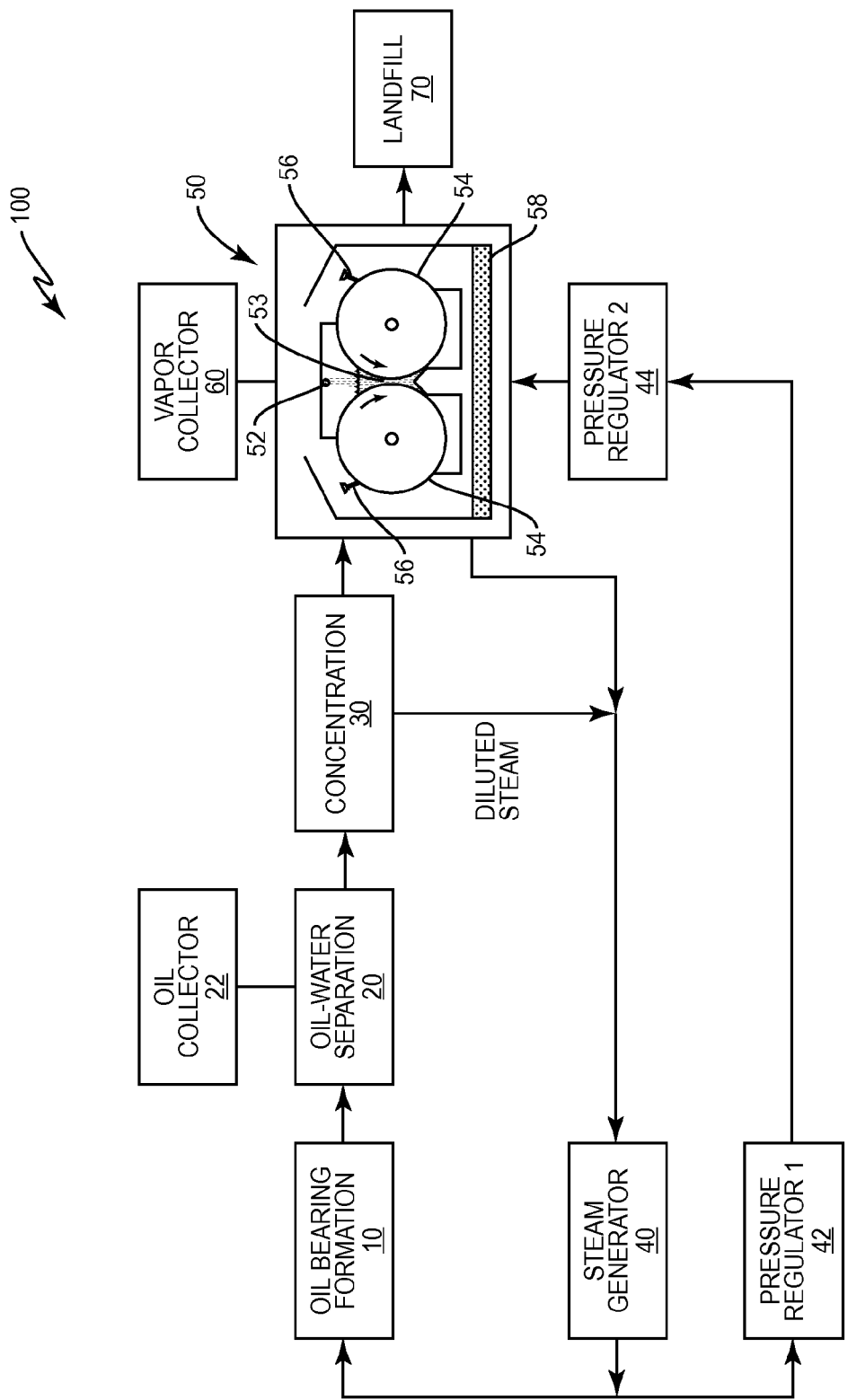
FIG. 1 is a schematic diagram of an oil recovery process.

Turning now to the process described herein, one embodiment of the process is depicted schematically in FIG. 1 and indicated generally by the numeral 100. The process includes injecting steam into an oil-bearing formation 10. Steam condenses, thereby providing heat to formation 10 to warm and make more mobile the oil that is contained therein. A resulting oil and water mixture, which includes the warmed oil and condensed steam, is directed from formation 10 to an oil-water separation process 20. Oil-water separation process 20 may include a variety of well-known technologies that may include oil removal filtration, induced gas flotation, and skimming. Separated oil is collected in oil collector 22 from whence it may be removed as a product. The remaining produced water contains by-products such as residual oil and other contaminants, such as hardness, for example, which require removal or reduction in order to re-utilize the water for steam generation or other purposes. Generally, the produced water is treated by a concentration process 30, which may include various processes, together or individually. For example, the produced water may be concentrated in one or more evaporators. In another embodiment, the produced water may be concentrated by a combination of an evaporator followed by a crystallizer. Typically, the produced water is concentrated in an evaporator or multiple evaporators which are sometimes followed by a crystallizer where the concentration may be brought to approximately 50-80% by weight total solids. In some cases where an evaporator is utilized to concentrate the produced water, the evaporator may be operated at an elevated pH to keep silica soluble or in evaporators where alkaline earth reagents are added to facilitate the controlled precipitation of silica. Further, it is appreciated that upstream of concentration process 30 various pre-treatment processes may be employed to at least partially remove such contaminants as hardness, silica, organics, and suspended solids. Such pre-treatment processes upstream of the concentration step 30 may also include pH adjustment and silica removal by seeding with various alkaline reagents such as magnesium oxide or calcium sulphate. In one embodiment, the concentration process generates a diluted stream, which may be directed to steam generator 40. Steam generator 40 produces steam that is injected into formation 10 as discussed above. Concentration step 30 also produces a concentrate, or concentrate stream, which is directed to a drum dryer 50. The concentrate may be in the form of a slurry, or concentrated slurry. The feed to the dryer may assume various forms. In one embodiment, the feed may comprise a combination of aqueous waste streams produced from steam-assisted gravity drainage (SAGD) or surface mining or cyclic steam stimulation (CSS) applications, with a portion of other aqueous streams collected at the time of recovery of bitumen during SAGD, surface mining or CSS processes. The other aqueous streams referred to above could include, for example, basal water, brackish water, river water, etc. A drying process facilitated by drum dryer 50 includes using steam from steam generator 40 to provide heat to dry the concentrate or slurry. The dried concentrate is collected and may be discharged to a landfill 70 or other disposal site. Vapor evolved in the dryer 50 is collected by a vapor collector 60 and further processed in various ways.

In some embodiments, the diluted stream or distillate produced by the concentration process may not be used for steam generation. For example, the diluted stream may be subjected to further treatment such as pH adjustment or, in certain cases, chemicals may be added to further treat the diluted stream or enhance its qualities for direct injection into oil-bearing formations. That is, in some embodiments, the diluted stream or distillate may be discharged, further treated and then discharged, or directly discharged into an oil-bearing formation.

Figure 3:
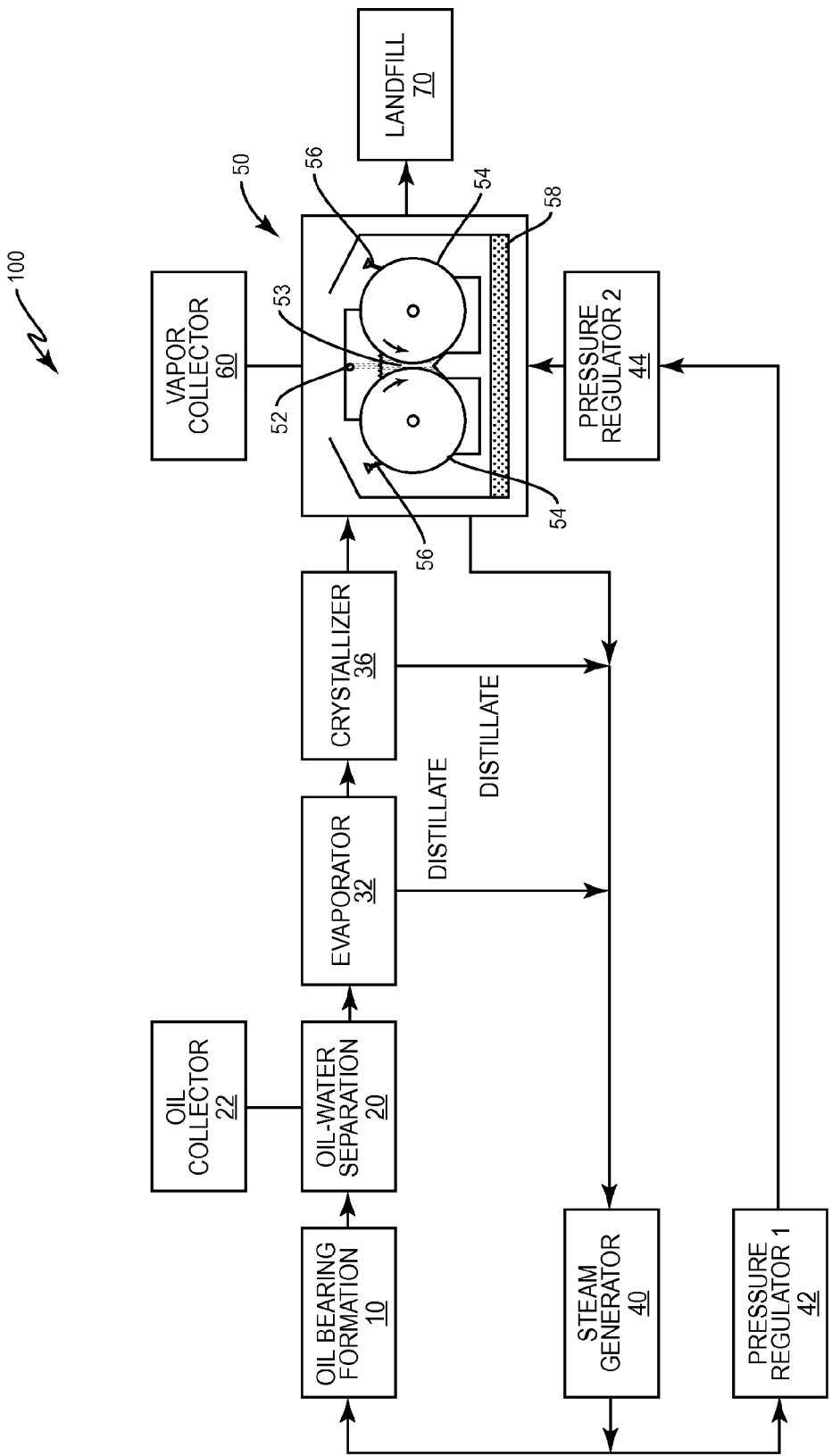
FIG. 3 is a schematic diagram of an embodiment of the oil recovery process that utilizes an evaporator and a crystallizer to concentrate produced water.

FIG. 3 illustrates an embodiment of the present invention that is similar in many respects to the process depicted in FIG. 1. In the FIG. 3 process, the concentration process discussed above and shown in FIG. 1 is carried out by one or more evaporators 32 followed by one or more crystallizers 36. This process may be particularly beneficial where the produced water includes salts. In this process, produced water is first directed to the evaporator or evaporators 32 which produce a distillate and a concentrated brine. The concentrated brine is directed to the one or more crystallizers 36 which produces a concentrate and distillate. Distillates from evaporator 32 and crystallizer 36 are directed as feed water to steam generator 40. Crystallized salts, for example, may be precipitated and remain mixed in the produced water concentrate that is directed from crystallizer 36 to dryer 50 for drying.

Figure 4:
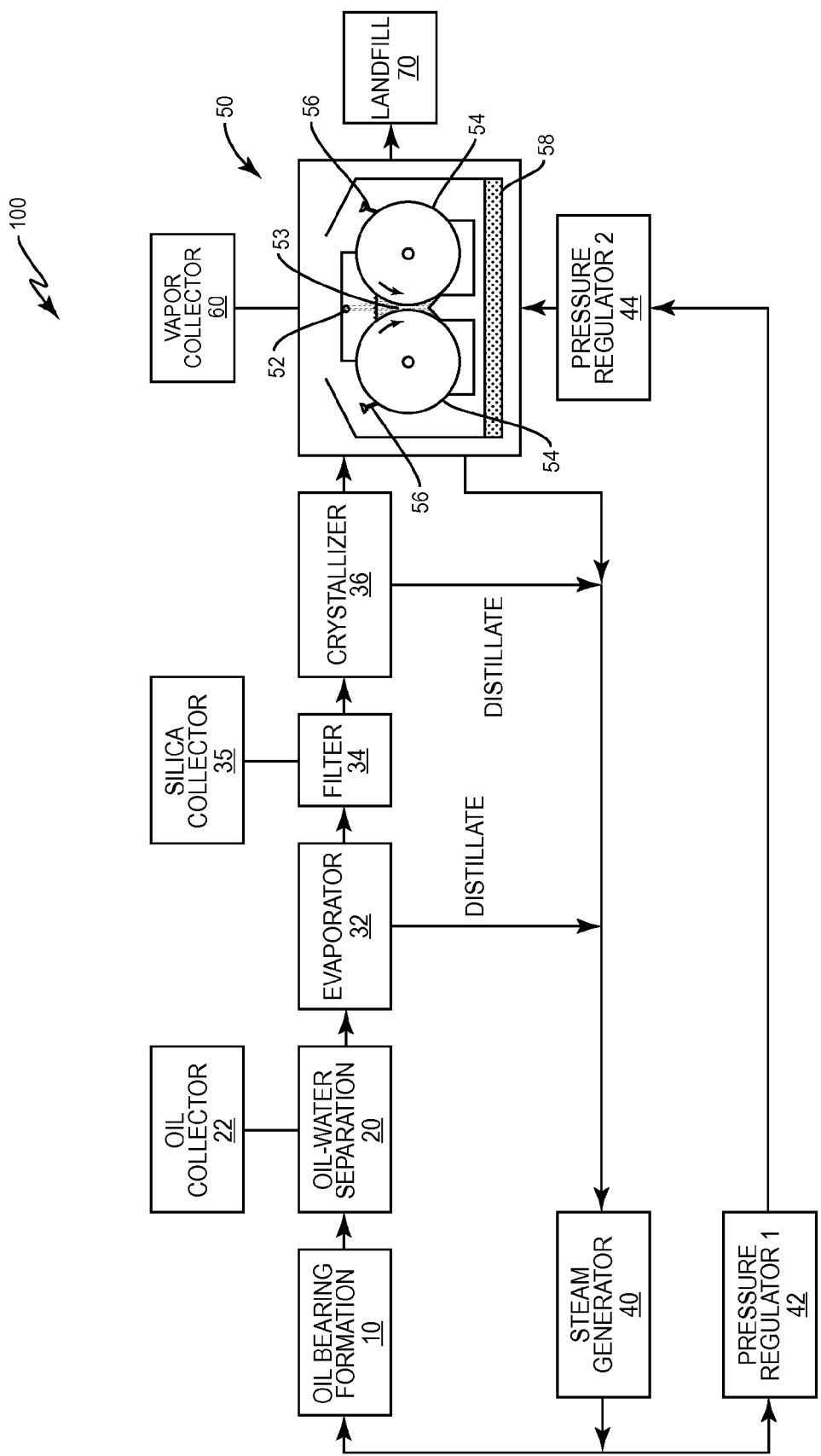
FIG. 4 is a schematic diagram of an embodiment of the oil recovery process that utilizes a filter to remove silica solids from produced water.

In some situations where there are high concentrations of silica in the produced water, the embodiment of FIG. 4 may be applicable. In the drying process, silica may become mobile in the air and may pose concerns. Removing silica utilizing filter 34 tends to address such concerns as silica is removed from the concentrate and collected in silica collector 35 rather than being directed to dryer 50.

Figure 2:
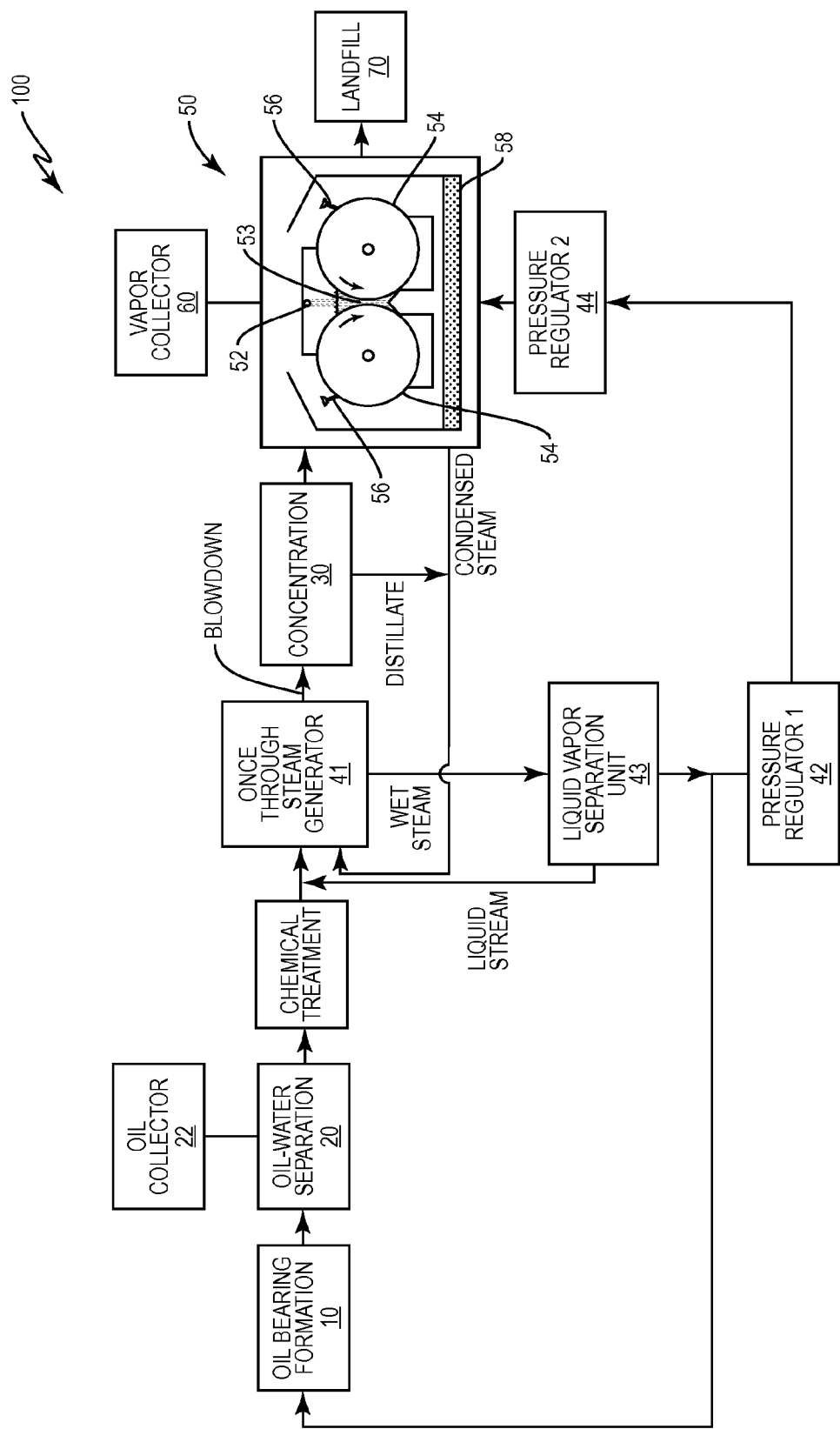
FIG. 2 is a schematic diagram of an embodiment of the oil recovery process that utilized a once-through steam generator to generate steam.

FIG. 2 shows another embodiment for the process of the present invention. The process depicted in FIG. 2 is similar in many respects to processes discussed above. The basic difference lies in providing chemical treatment after the oil-water separation process, and after chemical treatment directing the chemically treated produced water through a once-through steam generator 41 and thereafter concentrating the blowdown to produce a concentrate that is directed to the drum dryer 50. Various forms of chemical treatment may be performed upstream of the once-through steam generator 41. For example, chemical treatment may entail hardness removal and the collection of precipitated hardness compounds, along with other precipitated solids and suspended solids. Any one of several hardness removal processes can be utilized. For example, chemical softening can be employed where lime is added to the produced water to cause calcium carbonate and magnesium hydroxide to be precipitated. In some embodiments, an ion exchange unit operated in the sodium mode can be employed downstream of chemical softening to remove residual hardness down to as low as 0.2 mg/L. In other cases, a weak acid ion exchange operated in the hydrogen mode can be utilized to simultaneously remove both hardness and alkalinity. One reason for removing hardness compounds is to reduce the tendency of hardness compounds to scale or foul the heat transfer tubes in the once-through steam generator 41. Besides hardness removal, the chemical treatment process can remove other dissolved solids such as silica. In the case of silica, for example, magnesium oxide can be added to the produced water which will result in the co-precipitation of magnesium hydroxide and silica. Other chemicals such as coagulants or flocculants can also be added in the chemical treatment process to facilitate the removal of solids from the produced water.

Continuing to refer to the embodiment of FIG. 2, once the produced water has been chemically treated, it is directed into the once-through steam generator 41 which produces a wet stream and a blowdown. Wet steam is typically about 80% quality steam. As shown in FIG. 2, the wet stream is directed to a liquid vapor separation unit 43. Liquid vapor separation unit 43 separates the wet stream into steam, which is typically 98-100% quality steam, and a liquid stream. The liquid stream is returned to the once-through stream generator 41. The high quality steam produced by the liquid vapor separation unit 43 is directed into the oil-bearing formation 10 and a portion thereof can be directed through the two pressure regulators 42 and 44 back to the drum dryer 50.

The concentration process, designated by the numeral 30, can include various processes and sub-processes discussed above. In one embodiment, the concentration of the blowdown from the once-through steam generator 41 can be achieved by utilizing evaporators and/or crystallizers. The purpose of the concentration process is to concentrate the blowdown (to approximately 50-80% wt) from the once-through steam generator 41 and produce a concentrate and a distillate (sometimes referred to as a diluted stream). As depicted in FIG. 2, the concentrate is directed to the drum dryer 50. Distillate produced in the concentration process is mixed with condensed steam from the drum dryer 50 and directed back to the once-through steam generator 41.

Turning now to a more detailed discussion of drum dryer 50, the dryer includes a pair of counter-rotating drums 54 and is accordingly sometimes termed a double drum dryer. Drums 54 are disposed alongside each other and spaced apart forming a nip or gap 53 between the drums. A distributor 52 receives the concentrate and directs the concentrate over drums 54 and towards nip 53 such that the concentrate is spread over upper portions of the outer surfaces of the drums. Steam at a prescribed pressure is directed to the interiors of drums 54. In one embodiment, two stages 42 and 44 of pressure regulation are utilized to control the drum steam pressure to a prescribed level. Drums 54 are heated by the steam, and heat is transferred from outer surfaces of the drums to the concentrate. As drums 54 rotate, concentrate adheres to, or is supported on, the outer surfaces of the drums and further heated. As the concentrate on the drum surfaces dries, it may drop into a dried concentrate collector 58. Remaining dried concentrate is scraped off the rotating drums 54 by fixed scrapers or knives 56, and the scraped concentrate falls into collector 58. The dried concentrate from collector 58 is transported or otherwise moved to landfill 70 as discussed above.

Steam fed via regulators 42 and 44 to the interiors of drums 54 of dryer 50 is condensed, giving up heat for drying the concentrate. The resulting condensate may be drained from drums 54 and directed back to steam generator 40, or OTSG 41, as a part of the feedwater stream for the generator. In one embodiment, the second pressure regulator 44 may be incorporated in drum dryer 50. Two stages of pressure regulation, utilizing pressure regulator 42 with pressure regulator 44, may be useful due to relatively high pressure steam generated by steam generator 40 and comparatively lower pressure requirements of drum dryer 50.

It is appreciated that utilization of dryer 50 entails attention to drum diameter in selection of the dryer, drum separation or gap, drum rotational speed, and steam pressure to assure that the concentrate directed to the dryer is effectively transferred to the outer surfaces of the drums and dried before reaching collector 58. Sizes and material of drums 54 may vary. Typical diameters of drums 54 may range from 0.5 to 1.5 m. Drums 54 may be constructed of cast iron or aluminum and may have various coatings and outer surface treatments. A rotational speed range of about 1 rpm-10 rpm may be employed for drums 54, although higher rotational speeds could be employed. In some cases drum dryer 50 may generally have an allowable working steam pressure of about 11 barg. Typical operating pressures for drum dryer 50 may range from about 2 barg to about 8 barg. Generally, steam generator 40 or OTSG 41 is configured to deliver steam, based on formation injection requirements, at about 55 barg. Under such conditions, it is generally acceptable to employ pressure regulator 42 to reduce the pressure of steam destined for dryer 50 to about 12 barg and to employ pressure regulator 44 to reduce the steam pressure to the prescribed range.

In a typical operation, as illustrated in FIG. 3, the total solids concentration in the concentrated produced water directed from evaporator 32 ranges from about 10% to about 40% by weight. After crystallizer 36, the total solids in the concentrate directed to dryer 50 ranges from about 45% to about 80%.

The present invention provides a method of conserving water in oil recovery processes such as SAGD. Such conservation entails treating produced water to provide a flow of removal before drying, as illustrated in FIG. 4, silica removal reduces the concentration by about 1-10 percentage points. Resulting total solids concentration after processing through crystallizer 36 then ranges typically from about 45% to about 80%. sufficiently clean water for use in steam generation while minimizing the volume of waste solids that must be discharged to landfills or other disposal sites. There are numerous advantages to employing the double drum dryer 50. One advantage of using the drum dryer versus other conventional drying configurations is that the feed to the dryer can be a liquid or a slurry and large volumes of heated air typically required in other dryers are not required. These features eliminate the need for product recycle typical in other configurations and minimize the tendency of the dryer to produce significant dust with the dried product.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of recovering oil, treating resulting produced water, and utilizing the treated produced water to generate steam for injection into an oil-bearing formation, the method comprising:
   a. collecting an oil-water mixture from the oil-bearing formation;
   b. separating the oil from the oil-water mixture to produce oil and the produced water;
   c. concentrating the produced water to form a concentrate and a diluted stream;
   d. directing the diluted stream directly or indirectly to a steam generator and producing steam;
   e. directing the steam into the oil-bearing formation;
   f. directing the concentrate to a steam-operated drum dryer having a pair of side-by-side counter-rotating drums;
   g. depositing the concentrate on an upper portion of the drum dryer;
   h. drying the concentrate with the drum dryer by rotating the drums and directing the concentrate through a nip formed between the counter-rotating drums; and,
   i. after the concentrate passes through the nip of the counter-rotating drums, collecting the dried concentrate.

2. The method of claim 1 including directing a portion of the steam produced by the steam generator to the drum dryer and directing the steam into the two counter-rotating drums of the drum dryer.

3. The method of claim 1 wherein concentrating the produced water includes directing the produced water to at least one evaporator and producing the concentrate and dilute stream which comprises a distillate.

4. The method of claim 1 wherein the produced water is concentrated by treating the produced water in an evaporator and in a crystallizer disposed downstream from the evaporator.

5. The method of claim 4 wherein the dilute stream comprises a distillate formed by steam produced by the evaporator; wherein the evaporator also produces a concentrated brine that is directed to the crystallizer which concentrates the concentrated brine to form the concentrate and, wherein the concentrate formed by the crystallizer is directed to the drum dryer for drying.

6. The method of claim 1 wherein the concentrate comprises a slurry and wherein the slurry is deposited on upper portions of the counter-rotating drums, and wherein the slurry moves downwardly through the nip defined between the drums and wherein, in the process, the slurry is dried.

7. The method of claim 6 including spreading the slurry over upper portions of the surfaces of the drums and heating the slurry and evaporating water therefrom and producing a dried concentrate having approximately 70-100% by weight of total solids.

8. The method of claim 1 wherein the steam generator comprises a once through steam generator, a boiler, or a package boiler.

9. The method of claim 8 including condensing the steam, heating the drums, and directing a condensed steam back to the steam generator.

10. The method of claim 8 wherein the steam generator is a once through steam generator and the method includes directing a blowdown from the once through steam generator to an evaporator to concentrate the blowdown.

11. The method of claim 10 including directing the concentrated blowdown to the drum dryer for drying the concentrated blowdown.

12. A method of recovering oil, treating resulting produced water, and utilizing the treated produced water to generate steam for injection into an oil-bearing formation, the method comprising:
   a. collecting an oil-water mixture from the oil-bearing formation;
   b. separating the oil from the oil-water mixture to produce oil and the produced water;
   c. concentrating the produced water in an evaporator to produce an evaporator concentrate and a first distillate stream;
   d. directing the evaporator concentrate to a crystallizer and further concentrating the evaporator concentrate and producing a crystallizer concentrate and a second distillate stream;
   e. directing the first and second distillate streams to a stream generator and producing steam;
   f. directing the steam into an oil-bearing formation;
   g. directing the crystallizer concentrate to a steam operated drum dryer having a pair of side-by-side counter-rotating drums;
   h. depositing the crystallizer concentrate on an upper portion of the drum dryer;
   i. drying the concentrate with the drum dryer by rotating the drums and directing the concentrate through a nip formed between the counter-rotating drums; and
   j. after the concentrate passes through the nip of the counter-rotating drums, collecting the dried concentrate.

13. The method of claim 12 including filtering the evaporator concentrate and removing silica from the evaporator concentrate before the evaporator concentrate reaches the crystallizer.

14. The method of claim 12 including evaporating the produced water in the evaporator to where the evaporator concentrate includes a solids content of approximately 10 to approximately 40% by weight.

15. The method of claim 14 including concentrating the evaporator concentrate in the crystallizer to where the crystallizer concentrate includes a solids content of approximately 50 to approximately 80% by weight.

16. A method of recovering oil, treating resulting produced water, and utilizing the treated produced water to generate steam for injection into an oil-bearing formation, the method comprising:
   a. collecting an oil-water mixture from the oil-bearing formation;
   b. separating the oil from the oil-water mixture to produce oil and the produced water;
   c. removing hardness from the produced water;
   d. after removing hardness from the produced water, directing the produced water to a once-through steam generator and producing steam and a blowdown;
   e. directing the steam into the oil-bearing formation;
   f. concentrating the blowdown to form a concentrate;
   g. directing the concentrate to a steam operated drum dryer having a pair of side-by-side counter-rotating drums;
   h. depositing the concentrate on the upper portion of the drum dryer;
   i. drying the concentrate with the drum dryer by rotating the drums and directing the concentrate through a nip formed between the counter-rotating drums; and
   j. after the concentrate passes through the nip of the counter-rotating drums, collecting the dried concentrate.

17. The method of claim 16 wherein the once-through steam generator produces a wet steam and the method entails directing the wet steam to a liquid vapor separation unit and separating the wet steam mixture into steam and a liquid stream; and directing the separated steam into the oil-bearing formation and recycling the separated liquid stream back to the once-through steam generator.

18. The method of claim 16 wherein concentrating the blowdown also produces a diluted stream and the method comprises recycling the diluted stream to the once-through steam generator.

19. The method of claim 18 wherein the diluted stream produced by concentrating the blowdown comprises a distillate and the method includes directing the distillate to the once-through steam generator.

20. The method of claim 16 wherein concentrating the blowdown from the steam generator comprises first treating the blowdown in an evaporator to produce an evaporator concentrate and an evaporator distillate; directing the evaporator concentrate to a crystallizer and treating the evaporator concentrate in the crystallizer to produce a crystallizer concentrate and a crystallizer distillate;
   and directing the crystallizer concentrate to the drum dryer and drying the crystallizer concentrate.

21. The method of claim 20 further including recycling at least portions of the evaporator distillate and the crystallizer distillate to the once-through steam generator.

22. A method of recovering oil, treating resulting produced water, and utilizing the treated produced water to generate steam for injection into an oil-bearing formation, the method comprising:
  a. collecting an oil-water mixture from the oil-bearing formation;
  b. subjecting the oil-water mixture to a pretreatment process and removing oil from the oil-water mixture and producing produced water;
  c. directing the produced water to a steam generator and producing steam and a blowdown;
  d. directing the steam into the oil-bearing formation;
  e. concentrating the blowdown to form a concentrate;
  f. directing the concentrate to a steam-operated drum dryer having a pair of side-by-side counter-rotating drums;
  g. depositing the concentrate on the upper portion of the drum dryer;
  h. drying the concentrate with the drum dryer by rotating the drums and directing the concentrate through a nip formed between the counter-rotating drums; and
  i. after the concentrate passes through the nip of the counter-rotating drums, collecting the dried concentrate.

23. The method of claim 22 wherein the steam generator comprises a once-through steam generator and wherein the once-through steam generator produces the blowdown and a wet steam; directing the wet steam to a vapor separation unit and separating the wet steam into steam and a liquid stream; and
  recycling the liquid stream to the once-through steam generator.

24. The method of claim 22 wherein the steam generator comprises a once-through steam generator and downstream of the once-through steam generator there is provided at least one evaporator and at least one crystallizer for concentrating the blowdown produced by the once-through steam generator, and wherein the method includes concentrating the blowdown from the once-through stream generator in the evaporator to produce an evaporator concentrate and an evaporator distillate; directing the evaporator concentrate to a crystallizer and treating the evaporator concentrate in the crystallizer to produce a crystallizer concentrate and a crystallizer distillate; and directing the crystallizer concentrate to the drum dryer and drying the crystallizer concentrate.

25. The method of claim 24 further including recycling at least a portion of the evaporator distillate and the crystallizer distillate to the once-through steam generator.

26. A method of recovering oil and treating resulting produced water comprising:
  a. collecting an oil-water mixture from the oil-bearing formation;
  b. separating the oil from the oil-water mixture to produce oil and the produced water;
  c. concentrating the produced water to form a concentrate and a diluted stream;
  d. directing the concentrate to a steam-operated drum dryer having a pair of side-by-side counter-rotating drums;
  e. depositing the concentrate on an upper portion of the drum dryer;
  f. drying the concentrate with the drum dryer by rotating the drums and directing the concentrate through a nip formed between the counter-rotating drums; and,
  g. after the concentrate passes through the nip of the counter-rotating drums, collecting the dried concentrate.

27. The method of claim 26 including treating the diluted stream and directing the treated diluted stream into an oil-bearing formation.

28. The method of claim 26 wherein concentrating the produced water includes directing the produced water into an evaporator and utilizing the evaporator to produce the concentrate and a distillate, and directing the concentrate from the evaporator to the drum dryer.

29. The method of claim 26 wherein concentrating the produced water to form a concentrate includes directing the produced water into an evaporator and producing an evaporator concentrate and an evaporator distillate, and directing the evaporator concentrate to a crystallizer and producing a crystallizer concentrate and a crystallizer distillate, and directing the crystallizer concentrate from the crystallizer to the drum dryer.

* * * * *